United States Patent [19]

Barker et al.

[11] 4,101,612
[45] Jul. 18, 1978

[54] OPTICAL METHOD AND APPARATUS FOR DETERMINING STRESS RELAXATION

[75] Inventors: Robert I. Barker, Cuyahoga Falls; David P. King, Akron, both of Ohio

[73] Assignee: Monsanto Company, St. Louis, Mo.

[21] Appl. No.: 721,152

[22] Filed: Sep. 10, 1976

Related U.S. Application Data

[63] Continuation-in-part of Ser. No. 642,705, Dec. 22, 1975, Pat. No. 4,037,968.

[51] Int. Cl.² .............................................. G01B 5/08
[52] U.S. Cl. .................................... 264/22; 250/560; 264/40.2; 264/40.4; 264/176 R; 356/160; 356/167
[58] Field of Search ................... 264/40.4, 40.2, 22, 264/176 R; 356/159, 160, 167, 171; 250/560; 425/141; 73/15.6, 101

[56] References Cited

U.S. PATENT DOCUMENTS

| 3,292,270 | 12/1966 | Spunt | 264/22 |
|---|---|---|---|
| 3,551,545 | 12/1970 | Overdiep | 264/176 R |
| 3,719,425 | 3/1973 | Leitz et al. | 356/159 |
| 3,765,774 | 10/1973 | Petrohilos | 356/159 |
| 3,818,751 | 6/1974 | Karper et al. | 73/15.6 |

*Primary Examiner*—Jeffery R. Thurlow

[57] ABSTRACT

The dimension across an extrudable material is monitored during an extrusion period and during a stationary period.

10 Claims, 10 Drawing Figures

$D = T \sin \theta \left(1 - \dfrac{\cos \theta}{N(\cos \theta')}\right)$

N = REFRACTIVE INDEX OF CUBE

OPTICAL METHOD AND APPARATUS FOR DETERMINING STRESS RELAXATION

This application is a continuation in part of application Ser. No. 642,705, filed Dec. 22, 1975, now U.S. Pat. No. 4,037,968.

This invention relates to a method and apparatus for determining stress relaxation of elastomers.

Stress relaxation is a useful indicator of the behavior of elastomer compositions when subjected to various processes such as extruding, molding and calendering, and is useful to characterize elastomer compositions in terms of dimensional stability, flow throughput, etc. Prior methods of measuring stress relaxation have been by indirect means such as compressing coupled with measurement of the recovery by transducer means or by photographing. Photographing a sample is a static, time-consuming method subject to operator error. Compression methods operate at low shear rates. A necessary requirement for a meaningful processability test is that the shear rates directly relate to those encountered in the actual process. Processing rates are typically in the range of $10 - 10^5 \sec^{-1}$.

It has been discovered unexpectedly that the combination of means for extruding plastic material from an orifice with means for monitoring its dimensions is an excellent tool for determining stress relaxation. Methods applicable for the dynamic measurement of extruded strand of plastic material are already known. A preferred method is measurement of the strand by an optical measuring device as described in our application Ser. No. 642,705, filed Dec. 22, 1975, the disclosure of which is incorporated herein by reference. For example, the combination of a capillary rheometer, with the optical measuring device as a die swell detector provides an excellent system for evaluating physical properties of elastomers and other polymers which can be worked as plastic substances, whether of the thermosetting type like natural rubber, or the thermoplastic type like polypropylene. In the case of a thermosetting elastomer, it is possible to determine scorch, viscosity, and dimensional stability over a range of shear rates and curing characteristics. The optical measuring device or thickness gauge is advantageously used in combination with a rheometer to measure shear stress and to display rheometer shear stress and strand thickness.

As the material emerges from the orifice of a capillary rheometer it immediately increases in diameter. However, relaxation does not occur completely but approaches equilibrium asymptotically. Upon continuing to monitor the relaxation at a given point, stress relaxation can be measured and correlated with time. According to a preferred embodiment of the aforesaid principle, an extruded strand of plastic material is monitored for change in diameter from the orifice diameter during extrusion, then extrusion is interrupted while continuing to monitor the extrudate dimension within view of the die swell detector, and the stress relaxation is then correlated with time.

DIE SWELL MEASUREMENT

Figure 1:
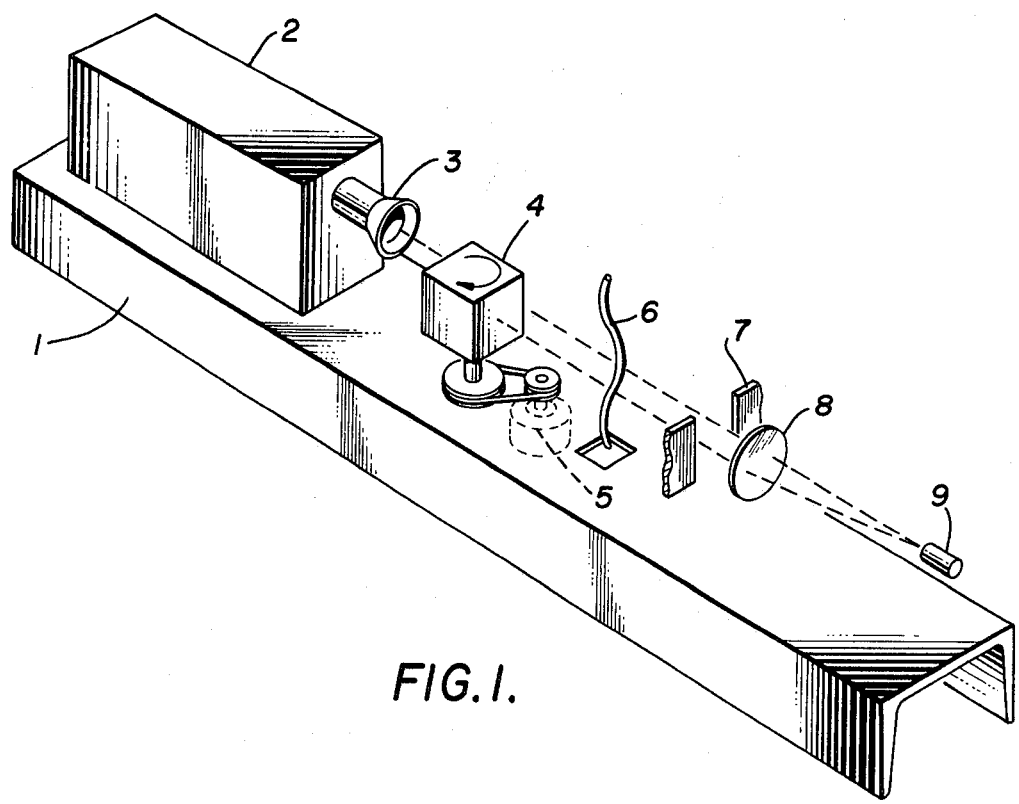
FIG. 1 is a schematic perspective view of major components of a die swell detector system.

Referring to FIG. 1, it shows the various elements of the system supported by mounting frame 1. A laser 2, mounted thereon, produces a narrow beam of parallel light in the infrared region, which is passed through a condensor/collimator 3. A cube prism 4 is rotated at substantially constant speed by motor 5. The prism maintains parallelism of the light and its rotation produces a sweep of a refracted beam of parallel light across the object 6 which in the case illustrated is continuous strand extruded from a capillary rheometer. The system is especially valuable for measuring small dimensions larger than can be measured by diffraction techniques and, in general, excellent results are obtainable over the range of about 0.01 inch to 1.0 inch (0.0254 - 2.54 cm). The beam also sweeps across measuring space 7 which is an aperture within which the strand is disposed. The aperture and, hence, the lateral active area may be 0.5 inch (1.27 cm) in a typical example but the system is not limited to this dimension. The light through the aperture passes through condensor lens 8, and the emerging beam is focused onto a photodetector 9.

Compensation for variation of position of the object within the measuring space as well as for motor speed variation is provided by a dual integration technique. To eliminate effect of motor speed variation, the electrical output (composite pulse) from the photodetector is separated into a long pulse determined by the dimensions of the aperture and a short pulse determined by the shadow of the strand or object to be measured. The long pulse starts and stops the integration of a fixed reference current from a constant current source. More particularly, the modulated current from the constant current source is gated into an aperture integrator with the long pulses created as the laser beam strikes the leading and trailing edges of the aperture. Since the aperture width is constant, the voltage output of the aperture integrator is proportional to the average sweep speed of the laser beam or motor speed. Such output voltage proportional to motor speed is the input to a differential amplifier which provides a current to an extrudate integrator. Because the current integrated in the extrudate integrator is proportional to motor speed by the same ratio as the current integrated in the aperture integrator, the output voltage of extrudate integrator is proportional to the strand diameter only and is not affected by motor speed. Therefore, motor speed variations have no effect on this voltage.

Figure 2:
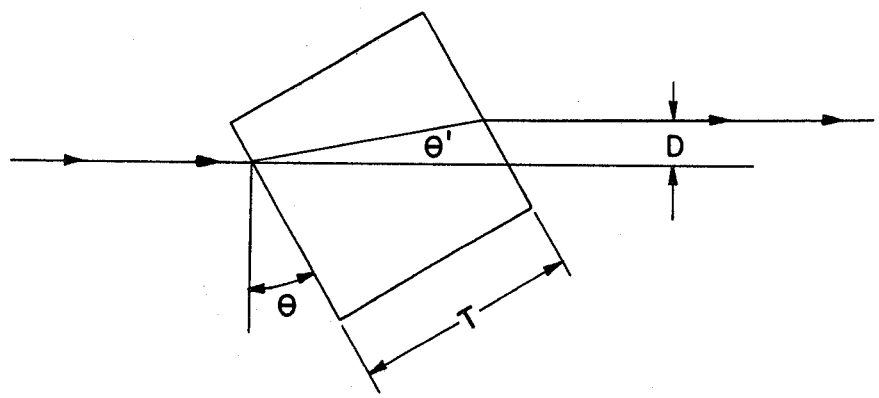
FIG. 2 illustrates the displacement of a light beam caused by refraction of the light beam by a cube.

There is a geometrical velocity error created by the refraction of a light beam by a rotating cube. Refraction of a light beam by a cube creates a displacement proportional to the rotational angle of the cube as illustrated in FIG. 2. If D represents the linear displacement of the incident beam, $$D = T \sin\theta \, [1 - (\cos\theta / N \cos\theta')]$$

where T is the length of the side of the cube, $\theta$ is the angle of incidence, $\theta'$ is the angle of deviation and N is the refractive index of the cube. The rate of change of displacement of the beam sweeping across the measuring space is not constant angular velocity but follows an approximate sine function. An approximate sine function (compensation signal) representative of rate of change of displacement of the beam is generated in synchronization with the aperture pulse from the pulse separator. This compensation signal is integrated in synchronization with a sweep compensation integrator and in synchronization with the shadow of the strand to provide offset correction for the extrudate integrator in relation to the position of the extrudate in the aperture. The outputs from the extrudate integrator and the sweep compensation integrator are summed to provide an output voltage proportional to strand diameter, which is not affected by motor speed fluctuation or position of the extrudate within the aperture. Effectively, the sample can move to any position in the measuring area without substantially affecting the measurement accuracy. Similarly, the sample can move in line with a receiving beam and because the spot size is constant, and the scanning beam rays are parallel, movement in this plane will not affect accuracy. The analogue voltage can then be scaled to provide dimensions in English units, metric units, and percent die swell with a single output amplifier and panel meter.

Figure 3:
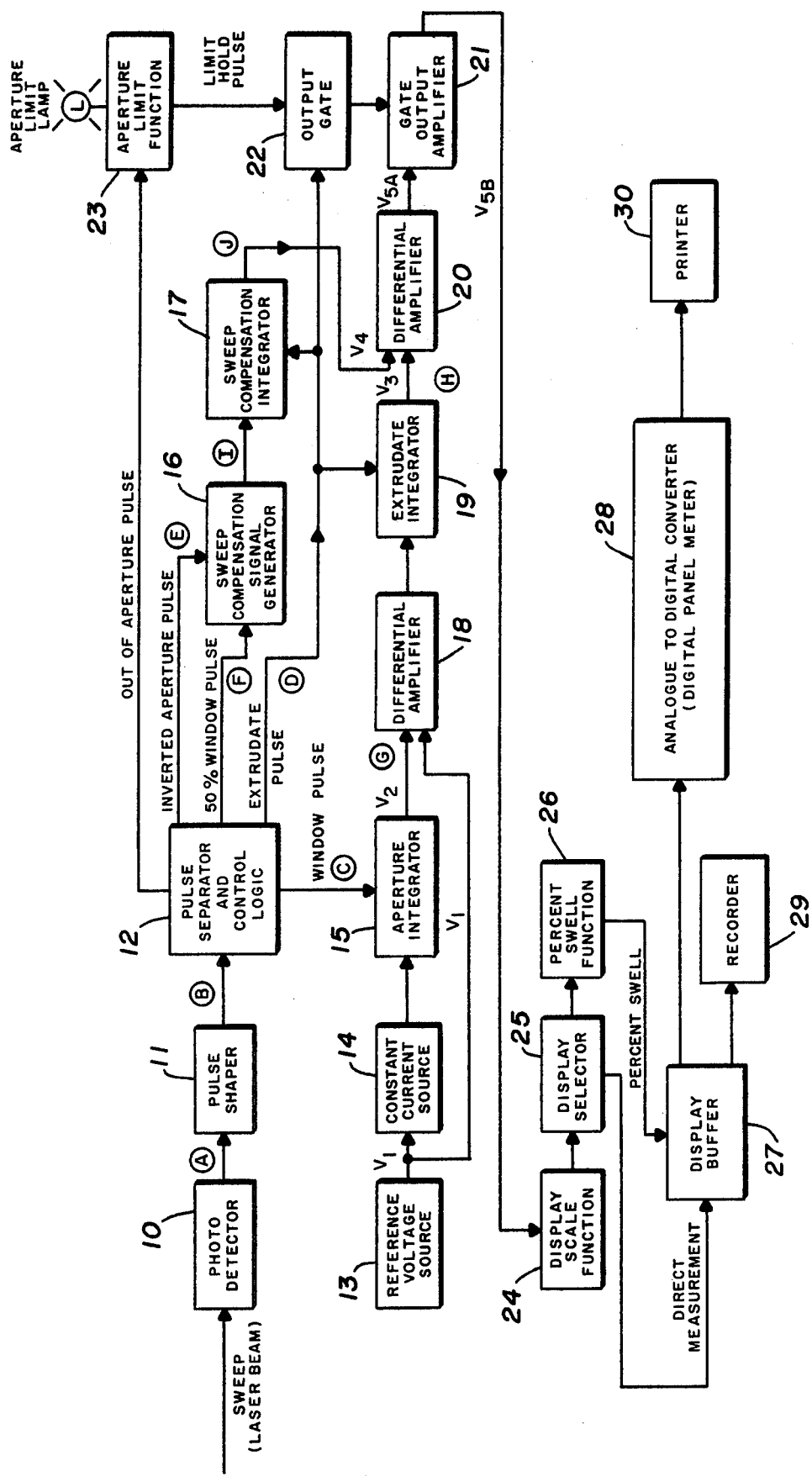
FIG. 3 is a block diagram showing the preferred system for processing the light detected through the measuring space by the photodetector.
Figure 4:
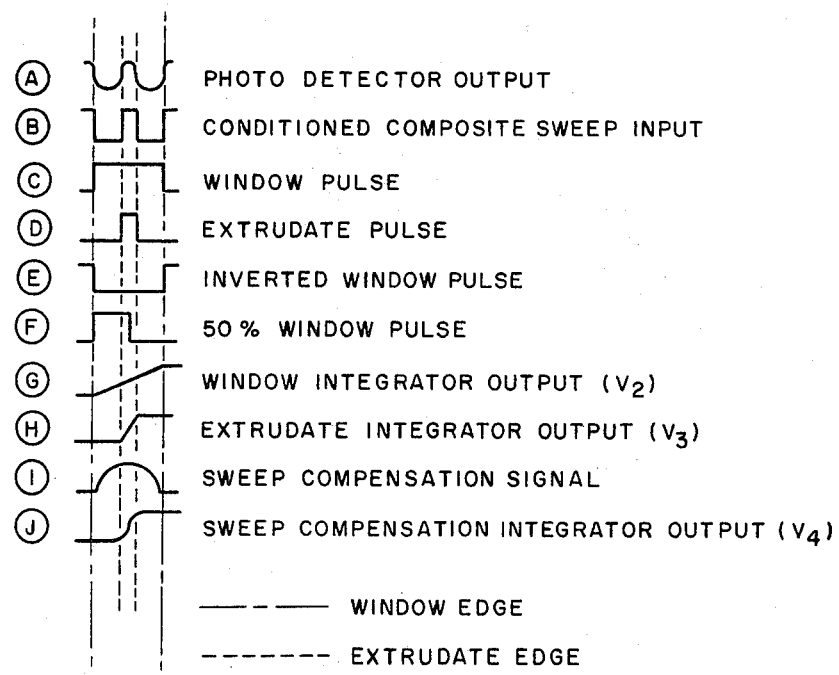
FIG. 4 illustrates the pulse shapes involved in the system of FIG. 3.

Referring to FIGS. 3 and 4, the photodetector 10 generates a signal represented by A of FIG. 4. The illumination detected by the photodetector as the beam crosses the edge of the measuring space (aperture) from the nonilluminated to the illuminated direction rises rapidly to a maximum and then falls to a minimum again as the beam passes one edge of the object to the illuminated to nonilluminated direction. It again rises rapidly to a maximum as the beam crosses the other edge of the object in the nonilluminated to illuminated direction. Finally, the illumination detected by the photodetector falls once more to a minimum as the beam crosses the other edge of the aperture in the illuminated to nonilluminated direction. The dashed vertical lines on FIG. 4 correspond to the aforementioned four edges.

Pulse shaper 11 converts the photoelectric output A to squared pulse B so as to provide a definite low-high, high-low sequence each time the beam crosses an edge, whether it be edge of the aperture or the edge of the object. The pulse separator and control logic 12 provide a pulse C designated "aperture pulse" representative of the width of the aperture (aperture and window are herein used synonymously) and a pulse D representative of the width of the object designated "extrudate pulse." It follows from FIG. 2 that the sweep velocity reaches a minimum halfway between the edges of the aperture. Since the rate of change of displacement or linear velocity is greatest at the aperture edges and progressively diminishes to the center from either edge, the correction is directly proportional to distance from an edge. For synchronization it is convenient to generate an inverted aperture pulse E and a 50% aperture pulse F because the correction is symmetrical around the midpoint of the aperture.

The aperture pulse is used to start and stop the integration of a constant current 14 derived from a fixed constant voltage source 13. Since the aperture width is constant, the voltage output G of the aperture integrator 15 is proportional to the average sweep speed of the laser beam determined by motor speed. This output voltage, proportional to sweep speed, is supplied to one input of differential amplifier 18. Such input ($V_2$) is compared with the reference voltage ($V_1$) from constant voltage source 13 and the algebraic sum (inversely proportional to average sweep speed) supplied as the input to the extrudate integrator 19. The extrudate integrator 19 is started and stopped by the extrudate pulse D. The current integrated is inversely proportional to sweep speed by the same ratio as the extrudate pulse width, therefore, the output of the extrudate integrator 19 is proportional to strand diameter only and not affected by average sweep speed.

A sweep compensation signal generator 16 generates a compensation signal in synchronization with the inverted aperture pulse E and the 50% aperture pulse F supplied from the pulse separator 12. This compensation signal I is integrated by the sweep compensation integrator 17 in synchronization with the extrudate pulse D. Pulse E represents the full aperture size but is inverted to afford the polarity which will enable it to perform its synchronizing function. Pulse F represents one half the aperture pulse and is used to determine the midpoint of the aperture. The leading edge of the inverted aperture pulse triggers pulse F, causing voltage to ramp up over the span of pulse F and ramp down again to zero at the end of the pulse E. The triangular wave thus formed is shaped into $\frac{1}{2}$ a sine wave. When triggered by pulse F and the leading edge of the aperture, the voltage builds up at a rate approximating a sine wave function to a maximum at the point corresponding to the midpoint of the aperture then drops again to zero at the trailing edge of the aperture.

The output of the extrudate integrator 19 and the sweep compensation integrator 17, waveforms H and J, are supplied to a differential amplifier 20 to be algebraically summed to provide an output voltage ($V_5A$) proportional to extrudate diameter and not affected by position of extrudate in the aperture or speed fluctuation.

The output of the differential amplifier 20 is supplied to the gated output amplifier 21, which performs a sample and hold function following each extrudate pulse D except when a limit hold pulse inhibits the output gate 22. The out of aperture pulse from the pulse separator 12 is initiated whenever the extrudate pulse D is missing in the composite pulse B input to the pulse separator 12. This condition occurs whenever the motion of the extrudate would cause it to appear (optically) to contact the edge of the aperture or to move completely out of the aperture. The out of aperture pulse triggers the aperture limit function 23 which latches into a hold condition, illuminating the aperture limit lamp L and inhibiting the output gate 22. The limit hold condition remains latched until a valid extrudate pulse appears.

This latching function insures that only valid measurements are applied to display (readout) circuits.

The signal $V_5B$ from the gated output amplifier 21 is applied to the display scale function 24 which scales it in English or metric engineering units. The scaled signal from the display scale function 24 is selected by the display selector 25 for display as either direct measurement of the extrudate diameter or percent swell based upon die (orifice) diameter. The percent swell function 26 subtracts the orifice diameter from the calibrated input and converts the difference into percent swell. The output from the percent swell function 26 or the output from the display scale function is then applied to the output buffer 27 for electrical isolation and impedance matching for display devices. One output is applied to an analogue to digital converter 28 (digital panel meter) and another to recorder 29. The digital panel meter may then drive printer 30 which prints out the selected parameter in digital units. The resultant display can thus be switched at will from strand diameter, for example, in thousandths of an inch or in millimeters to percent die swell.

Although the scanning beam diameter is reduced from approximately 0.40 inches (1.016 cm) to 0.005 inches (0.0127 cm) by the condensing/collimating lens combination, there is still a potential error caused by part of the beam passing the edge of the object to be measured. Previous techniques have used a variable threshold level set for each nominal measurement or a zero crossing of the second differential of the photodetector. The former technique is effective only over a narrow range of diameters near that of a set nominal and the latter technique requires sophisticated electronics. Measurements with calibrated gauge pins have shown this beam diameter error to be a constant value for any specific beam and photodetector combination. With the above-mentioned reference integration circuit, a slight offset of the modulated reference current will effectively compensate for this beam diameter error for all diameters within the capacity of the system.

DESCRIPTION OF PREFERRED EMBODIMENTS

Figure 5:
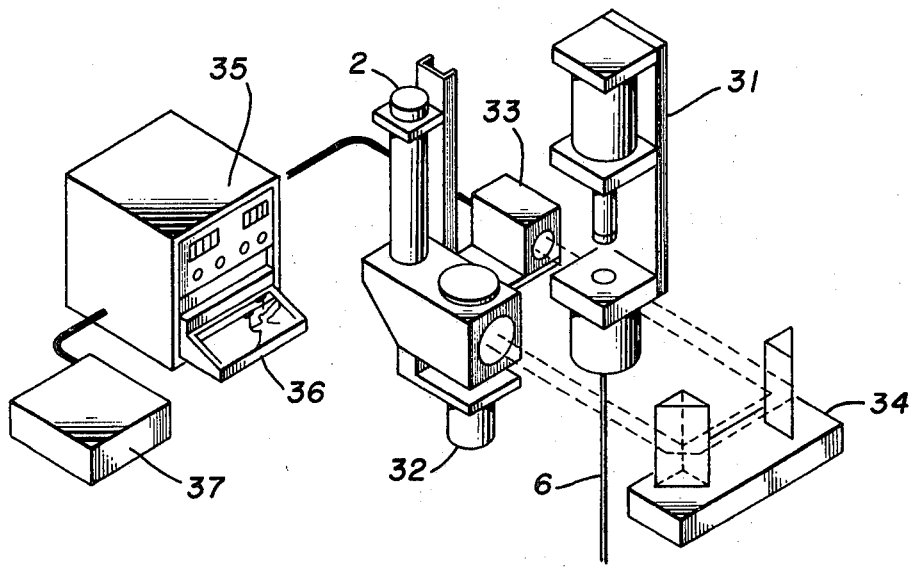
FIG. 5 is a system layout for property evaluation comprising a capillary rheometer combined with the optical measuring apparatus as a die swell detector.

FIG. 5 illustrates a system layout for evaluating properties of plastic substances by combining a capillary rheometer with the optical measuring apparatus as a die swell detector. An automatic capillary rheometer 31 extrudes from its orifice the strand 6 in the path of parallel light rays from the laser 2. The laser is vertically mounted and the strand extruded vertically but the collimator rotating cubic prism assembly 32 directs the light horizontally through a collimator and rotating prism so as to sweep the light rays across the strand and across the aperture in the photodetector assembly 33. The collimator rotating cube assembly corresponds to collimator 3 and rotating prism 4 of FIG. 1 and contains in addition a front surface mirror to direct the laser beam. It simplifies the arrangement of the electronics to detect the light on the same side of the strand as the side on which the light source is mounted and, in addition, permits vertical adjustment of the beam to enable either manual or automatic vertical scan of the extrudate. Accordingly, reflecting prism assembly 34 comprising a base on which two reflecting prisms are mounted diverts the light back to photodetector assembly 33. The photodetector assembly contains an aperture, condensing lens and photocell and corresponds to aperture 7, condensing lens 8 and photodetector 9 of FIG. 1. The die swell dimensional monitor electronics 35 carry out the functions of elements 11-29 of FIG. 2 and in addition may contain the electronics for the conventional capillary rheometer. Thus, the strip chart recorder 36 may chart dimensions of the extrudate or percent die swell as one tracing and rate of shear or stress as the other. The data printer 37, which may be a teletype or the like, prints out such digital readouts as are desired.

Figure 6:
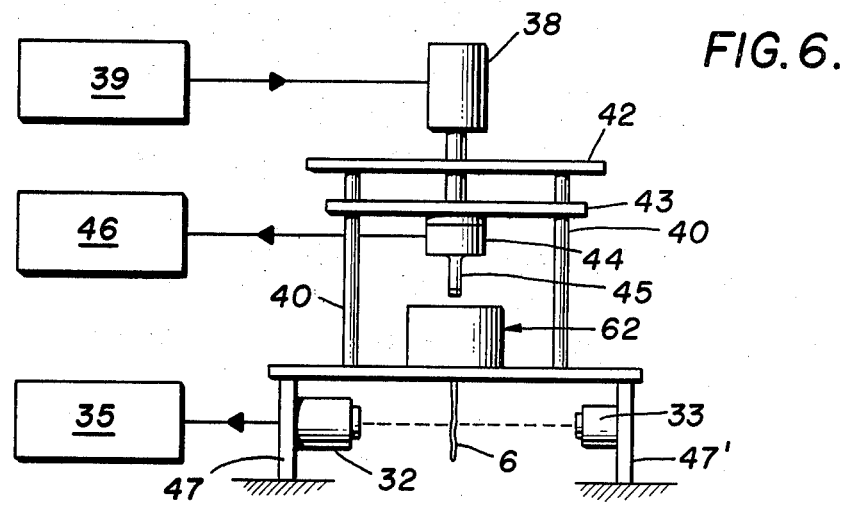
FIG. 6 is a schematic layout of another embodiment of the combination of a capillary rheometer with the die swell detector, showing the principal components and their relationship to the electronics for driving the rheometer and measuring stress relaxation.

The components of a system for measuring processability will be more clearly understood by referring to FIG. 6 which relates the electronics to a capillary rheometer. The drive system for the capillary rheometer 38 preferably comprises a closed loop servo hydraulic cylinder, controlled by digital pulses supplied by the drive electronics programmer 39. For example, the drive system may comprise an Olsen Linear Electrohydraulic Pulse Drive Model No. LS300 manufactured by Olsen Control Inc. Bristol, Conn. and described in U.S. Pat. No. 3,899,956. The control may be a microcomputer such as the MCS-40 microcomputer available from Intel Corporation. In this embodiment, guide rods 40 mounted between base support 41 and top support 42 guide the movement of a constant rate crosshead 43. The drive system drives the crosshead at a constant rate independent of loading effects of the material under test. The digital drive enables the selection of either a predetermined single constant rate of crosshead travel or a controlled continuous sweep of different rates of crosshead travel over a predetermined range as provided by the programmer.

Figure 7:
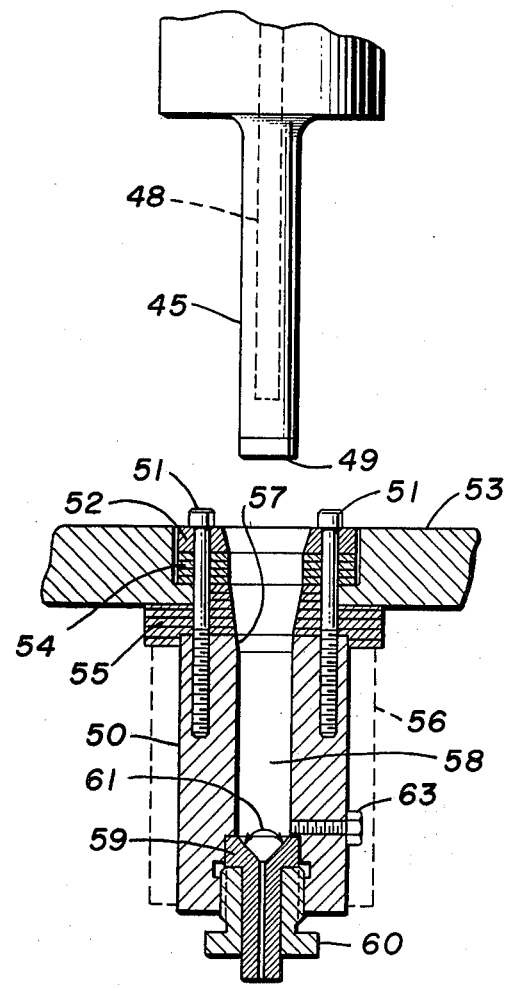
FIG. 7 is a cross-sectional view of the piston and cylinder of a capillary rheometer suitable for use in a processability testing system.

A strain gauge load cell 44 is mounted on the crosshead and suitably coupled through head insulation to a temperature-controlled piston 45. The stress signal from the load cell is processed by the stress electronics 46 and can be recorded as hereinafter explained. Alternatively, a pressure transducer 63 may be mounted at the base of the sample test cavity but above the entrance to the capillary orifice as shown in FIG. 7. The laser scanning monitor 32 is the collimator rotating prism assembly previously described and is under control of the die swell electronics 35. It is generally in a fixed position, usually 3 – 300 millimeter from the orifice outlet, at the base of the capillary rheometer on support member 47. Photodetector 33, mounted on opposite support member 47', views extrudate 6 extruded from the temperature-controlled barrel and orifice assembly indicated generally as 62.

In another embodiment advantageous for determining rapidly swelling materials, the scanning assembly is continuously raised and lowered as by an electrically driven motor, (not illustrated). For example, in a typical case, the scanning assembly might be raised and lowered over a range of 3 – 50 mm. from the orifice outlet. The strand dimension at the beginning of the cycle 3mm. from the orifice outlet, and the maximum strand dimension during the cycle, provide a convenient basis for determining swelling rate. The distance from the orifice at which the maximum occurs, which will of course be the maximum distance from orifice outlet if swelling continues over the entire range of observations, can be readily determined from the continuous graphical recording of dimensions. That distance combined with knowledge of the rate at which the material is extruded permits calculations of the time to achieve maximum swelling and this together with knowledge of extent of swelling over run time permits precise determination of the rate of swelling of the test material.

FIG. 7 is a cross-sectional view of the piston and cylinder of the preferred capillary rheometer. Piston 45 contains a cartridge heater 48 and comprises a terminal section 49, machined to engage the barrel 50 in close tolerance, and roughened at the tip to engage the test sample. A continuous groove is machined into the tip. The root mean square depth of the grooves is typically in the range of 125 to 250 micro inches (0.375 - 0.653 cm) as measured by a proliferometer. The sample residue clings to the piston surface so roughened and is easily removed upon raising the piston. The piston displacement range may typically be 0.05 - 5.0 in. per minute (0.127 - 12.7 cm.) per minute ± 1%, and the load capacity range is 0 - 6200 pounds (0 - 2813 kg).

In the cylinder section cap screws 51 hold clamp ring 52, support plate 53 and insulators 54 and 55. Heater 56 surrounds the barrel and controls temperature independently of the piston to precise limits over the range from slightly above ambient temperatures to 550° F (287.78° C). The dimensions of the barrel section 50 are designed to permit easy loading of the sample. Typically, the diameter is ¾ inch (1.905 cm). The clamp ring 52 has about a 15° entrance angle and the barrel has a piston lead in taper 57 which may be 3°, for example, to facilitate piston entrance and sample loading. The straight section of the barrel comprises the sample-holding portion 58 which in a typical case may be 2 in. (5.08 cm). At the base of the barrel 50 but above the entrance to the capillary orifice is the aforementioned pressure transducer 63. For some polymers a pressure transducer indicates sample stress more accurately than a load cell shown in FIG. 6. Certain polymers of which natural rubber is an example tend to stick to the barrel. Because of the resulting pressure loss, the load applied by the piston may not be an accurate measure of the stress on the material at the bottom of the barrel. The piston automatically stops when it reaches the extremity of the sample holding portion to avoid injury to the capillary.

Capillary body 59 is held in place by retaining nut 60. A number of different orifices are provided and can be readily interchanged. The entrance angle 61 can vary but will generally be 60° - 90°. It will be noted that an entrance angle of 90° as illustrated means that each side of the cone-shaped entrance section makes an angle of 45° with its base. If desired, a compound entrance angle may be used such as 90° and 60° with the entrance area as much as 100% of the piston surface area. The capillary orifices typically have a minimum of 20:1 length over diameter ratio and nominal diameters of 0.020, 0.040, 0.080 and 0.100 inches (0.0508, 0.1016, 0.2032 and 0.254 cm).

The operation is briefly as follows:

A sample of rubber is placed in the barrel section, the piston is driven down initially compressing the sample in the barrel. A preheat condition is usually established to enable the sample to reach equilibrium temperature of the barrel. After this dwell period the crosshead will then be driven down at a controlled rate. This rate will be single speed or continuously variable depending upon the test mode selected.

The load cell or pressure transducer will detect the force required to extrude the sample and the resultant signal from the stress electronics, which can be either analogue or digital, will be presented on a chart recorder or displayed digitally. Simultaneously, the emerging extruded strand will be monitored by the die swell device and from the electronics of the die swell device an output is derived, which will correspond to percent die swell or actual dimensions of the extrudate. This information can be displayed digitally or presented on the chart recorder.

Figure 8A:
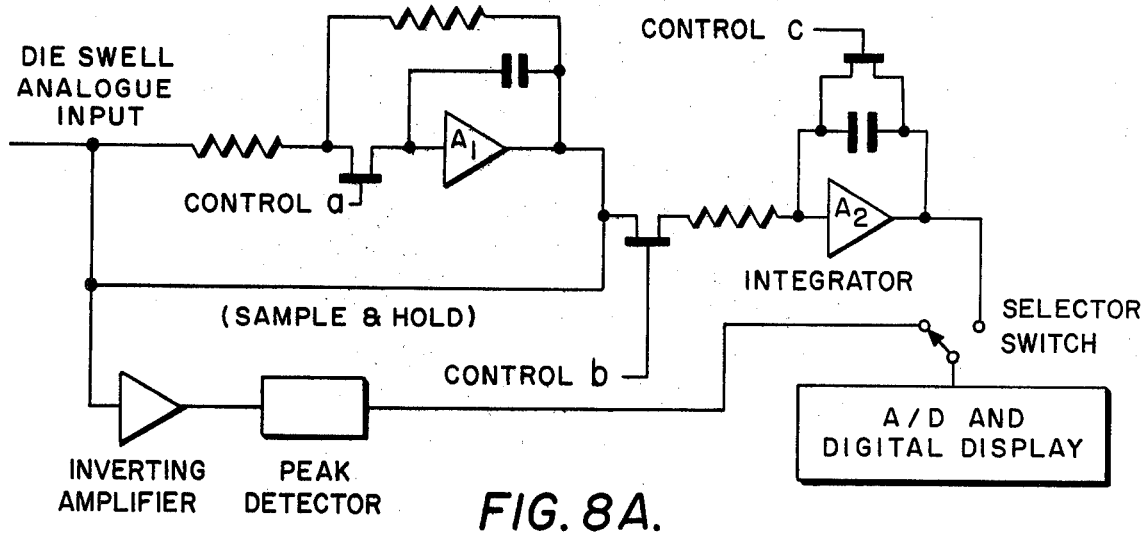
FIG. 8A is a schematic layout of a peak detector and die swell integrator suitable for determining peak relaxation and the area under a relaxation curve such as shown in FIG. 8B.
Figure 8B:
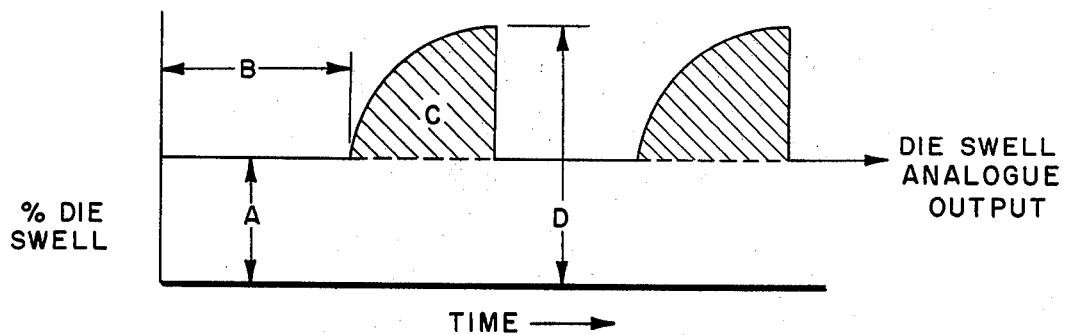
FIG. 8B is an idealized representation of die swell analogue output during intermittent extrusion and static periods plotted against time.

FIG. 8A indicates schematically a typical die swell integrator suitable to extract the area under the relaxation curve shown in FIG. 8B. Time period B represents the extrusion period and A is the corresponding percent die swell for that period. At the end of period B the crosshead is stopped. The die swell monitor continues to monitor the stationary strand. The analogue output of the die swell electronics is fed to the input of a sample and hold circuit comprising suitable resistors, electronic switch capacitor and operational amplifier $A_1$. Controls (*a*), (*b*) and (*c*) are in effect electronic switches. During period B this sample and hold circuit is active and the output of $A_1$ (same as die swell input) is continuously following the actual die swell signal. Control (*a*) is closed and at the end of B it switches to open thereby changing the circuit to "hold" mode. The output of the sample and hold circuit represents the percent die swell "A" during extrusion. Control (*b*) now closes and control (*c*) which is normally closed simultaneously opens thereby connecting the integrator circuit to which is fed the signal voltage after subtracting the voltage of the sample and hold circuit. The input to the integrator will be the increasing recovery signal minus "A." Strictly speaking a sample and hold circuit stores the last value received but there is some averaging in the operation and the value "A" is in effect the average die swell during extrusion. The signal representing the area under the curve C will be obtained from the integrator. The total die swell is represented by D.

After a defined time period, control (*b*) will again be operated, this time to open and thereby prevent further integration while (*c*) remains open and causes the integrated value to be stored. The resultant integral can be connected to a digital output and displayed. After some finite elapsed time following the integration control (*c*) is activated to its normally closed position and control (*a*) simultaneously closes thereby resetting the integrator to its original condition prior to making another measurement.

Figure 9:
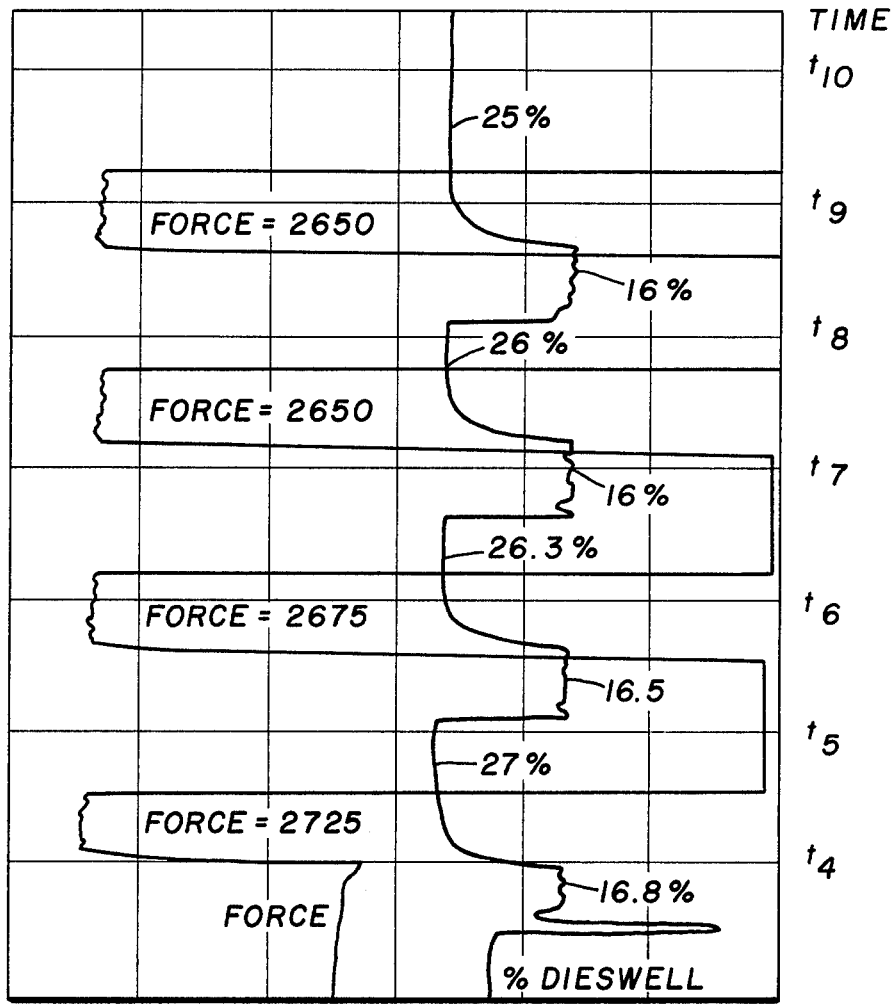
FIG. 9 illustrates the tracings of a two-pen strip chart recording of processability tests on styrene-butadiene rubber stock.

FIG. 9 shows tracings of a two-pen strip chart recording tests of a styrene butadiene copolymer rubber stock at a shear rate of 250 $sec^{-1}$ under the following conditions using a constant shear rate capillary rheometer system as illustrated in FIG. 6:

1. Material: SBR compound
2. Test temperature: 212° F (100° C)
3. Sample volume: 0.443 cu in. (7.26 cu cm)
4. Sample preheat time: 4.0 minutes
5. Sample weight: 9.5 grams
6. Force range: 0 to 5000 pounds (0 - 2268 kg) full scale
7. Die swell range: 0 to 100% full scale
8. The total volume of 0.443 in.$^3$ is extruded in four separate increments of 0.11 in.$^3$ (1.80 cm$^3$) to increase the total number of relaxed die swell measurements for each test run.

Orifice size, temperature, sample volume and shear rate are constant. The system is calibrated so that one pen traces die swell in percent and the other traces force. For example the average die swell over the four cycles is 16.33%, each unit on the horizontal axis representing 1% die swell in the case of one pen and about 60 pounds or 27.22 kg. in the case of the other. The vertical axis represents time. It will be appreciated that the force intervals correspond to the extrusion intervals, although the pen which traces the force is displaced upward on the time axis to avoid interference with the other pen. The results of six tests in which the average force varied (different preselected shear rates) are summarized on the following page. The reported data are the average force, shear stress and die swell for each test run.

| Test No. | Average force lb. | Average force kg. | Average shear stress megadynes/cm$^2$ | Uncorrected shear rate (sec$^{-1}$) | Die swell Run (%) | Die swell Relaxed (%) |
|---|---|---|---|---|---|---|
| 1 | 2081 | 943.92 | 4.38 | 80 | 16.75 | 22.3 |
| 2 | 2333 | 1058.23 | 4.85 | 110 | 17.2 | 24 |
| 3 | 2475 | 1122.63 | 5.15 | 150 | 16.8 | 25 |
| 4 | 2675 | 1213.35 | 5.53 | 250 | 16.33 | 26.3 |
| 5 | 2800 | 1270.05 | 5.8 | 350 | 16.5 | 27.5 |
| 6 | 3030 | 1374.38 | 6.3 | 500 | 16.8 | 30.1 |

With respect to these data, the function of the sample and hold circuit of FIG. 7A is to hold the value of the die swell detected during extrusion and the function of the integrator is to integrate the difference between such values and the varying values of total die swell during the period the strand is stationary. The "Die swell Relaxed" in the table above is the total percent die swell detected at the end of the stationary period corresponding to the value "D" in FIG. 8B. It has been found that the value "D" correlates directly with volumetric die swell, the latter being usually determined after a predetermined period of time, usually hours whereas the result is obtained within seconds by the present invention. If desired, the integrated values may be obtained directly from the tracings by measuring the area under the die swell curve during the periods the strand is stationary. The stationary periods are preferably short to minimize effect of cooling.

It will be appreciated that the value "D" in FIG. 8B is the maximum die swell. In this connection the peak detector circuit, preferably included in the electronic controls, may be, for example, a Burr-Brown peak detector Type No. 4084/25 and if desired a peak detector circuit may replace instead of supplement the integrator circuit. It should be appreciated, however, that the two circuits provide different information about the processability of a material. For example, two materials with similar elasticities but different viscosities will reach comparable swelling values but at different rates. As pointed out before, maximum die swell correlates well with volumetric die swell. In the embodiment illustrated in FIG. 8A both are being determined and depending upon the setting of the selector switch either the peak swelling or the swelling integral may be displayed in the unit identified as analogue to digital converter and digital display. The time selected for the resting period should be long enough to allow development of a maximum value and may be adjusted from time to time depending upon the material being evaluated.

A single extrusion period for the entire sample followed by a single relaxation period is advantageous for production control tests. Initially a stock of unknown processing characteristics will usually be examined over a number of preselected shear rates and then relatively evaluated at shear rates approximately those under which it is being processed in the plant.

Although the invention has been illustrated by typica examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A method of measuring stress relaxation of extruded material which comprises extruding a continuous strand of the material from an orifice while optically monitoring the dimension across the material, then discontinuing the extrusion while continuing to monitor the dimension across the material, and calculating the time rate of change of the dimension.

2. The method of claim 1 in which the extrusion is at constant shear rate.

3. The method of claim 1 in which the extrusion is at constant shear stress.

4. The method of claim 1 in which the extruding and discontinuing periods are repeated.

5. The method of claim 1 in which the extruded material is strand of organic polymer, the dimension across the strand is monitored during a predetermined time of extrusion, then during a predetermined time of resting and the dimensions greater than the dimensions during the extrusion time are integrated during the resting time.

6. The method of claim 1 in which the extruded material is strand of organic polymer, the dimension across the strand is monitored during a predetermined time of extrusion and during a predetermined time of resting and the maximum dimension during the predetermined time of resting is determined.

7. The method of claim 1 in which the material is extruded over a series of preselected different shear rates and both shear stress and die swell are determined as a function of shear rate over one or more relaxations at the preselected shear rates.

8. Apparatus for measuring stress relaxation of extrudated material comprising,
extrusion means for extruding a strand of material between the edges of an aperture,
control means to provide extrusion during a preselected time of extrusion and to discontinue extrusion during a preselected time of resting,
optical means for scanning the extrudate in the aperture, measuring the dimensions across the material during said preselected time intervals and generating signals proportional to the dimensions,
and means for integrating the values of the dimension during the interval of resting comprising an integrator circuit adapted to integrate the signal generated during the interval of resting.

9. Apparatus of claim 8 in which the extrusion means comprises means for extruding at constant shear rate or constant stress and in which the control means includes means for repeating the extruding and resting times.

10. Apparatus of claim 8 in which the means for extruding strand includes means for extruding over a series of different constant shear rates and means to plot shear stress vs shear rate.

* * * * *